United States Patent [19]

Theil

[11] Patent Number: 5,711,802
[45] Date of Patent: Jan. 27, 1998

[54] HEAT TREATMENT OF LIME SLUDGE

[75] Inventor: Jorgen Theil, Copenhagen, Denmark

[73] Assignee: F. L. Smidth & Co. A/S, Denmark

[21] Appl. No.: 704,718

[22] PCT Filed: Feb. 23, 1995

[86] PCT No.: PCT/EP95/00652

§ 371 Date: Sep. 17, 1996

§ 102(e) Date: Sep. 17, 1996

[87] PCT Pub. No.: WO95/25699

PCT Pub. Date: Sep. 28, 1995

[30] Foreign Application Priority Data

Mar. 22, 1994 [DK] Denmark .................. 0329/94

[51] Int. Cl.$^6$ .................. C04B 2/02
[52] U.S. Cl. .......... 106/792; 106/738; 423/173; 423/177; 423/430; 423/175; 432/14; 432/67; 432/68; 432/69; 432/36
[58] Field of Search .................. 106/792, 795, 106/738; 423/430, 173, 175, 177; 432/14, 67, 68, 69, 36

[56] References Cited

U.S. PATENT DOCUMENTS

| | | | |
|---|---|---|---|
| 5,354,375 | 10/1994 | Cohen | 106/792 |
| 5,413,635 | 5/1995 | Matweecha et al. | 106/792 |

FOREIGN PATENT DOCUMENTS 663371  12/1951  United Kingdom .

Primary Examiner—Michael Marcheschi
Attorney, Agent, or Firm—Brumbaugh, Graves, Donohue & Raymond

[57] ABSTRACT

A method and plant for heat treatment of lime sludge ($CaCO_3$) formed by the causticizing process during the manufacture of paper pulp. The lime sludge is dried and pulverized in a first process stage and preheated in a second process stage by means of hot exhaust gas coming from a kiln. In order to ensure that the temperature in the second process stage does not exceed a predetermined temperature lying within the range from 400°–600° C., the relationship between the amount of energy available in the exhaust gas for preheating in the second process stage and the amount of accumulated energy in the material which is to be preheated is regulated.

8 Claims, 1 Drawing Sheet

HEAT TREATMENT OF LIME SLUDGE

BACKGROUND OF THE INVENTION

The present invention relates to a method (hereinafter referred to as of the kind described) and a plant for heat treatment of lime sludge ($CaCO_3$) formed by the causticizing process during the manufacture of paper pulp. When manufacturing paper pulp according to the sulphate process, green liquor ($Na_2CO_3$) is causticized with burned lime (CaO), thereby generating a sodium hydroxide solution (NaOH) or white liquor which is utilized for boiling the wood pulp from which the paper pulp is manufactured and a product with a content of calcium carbonate ($CaCO_3$) or lime sludge. Typically, the product is dried and burned in a kiln plant for manufacturing burned lime which, in turn, can be used for the causticizing process. This cycle is generally referred to as the lime cycle of the sulphate process.

A previously known and widely used method for lime sludge reburning consists in equipping the uppermost end of a rotary kiln with a number of suspended chains inside the kiln in order to promote the heat transfer rate and the disintegration of the supplied lime sludge in such a way that the drying of the latter within the kiln is promoted. The treated product in the form of burned lime is removed from the kiln after undergoing cooling in the material cooler fitted immediately after the kiln. The kiln is fired by oil, gas or bark powder, and the burned lime reaches a temperature of 1000°–1200° C. during the treatment in the kiln. The drying-out of the substantial water content in the lime sludge results in a relatively low exit temperature of 150°–200° C. in the flue gases, which means that the stack loss will be moderate. The operating efficiency of the kiln, i.e. the portion of the fired calorie quantity being utilized for drying and calcination of the treated product, is quite high, and the thermal economy of the kiln must generally be characterized as being satisfactory for the purpose.

Improved technology for the manufacture and dehydration of lime sludge has resulted in lower water percentage rates in the kiln feed, but the expected fuel saving has not been achieved, instead there has been a rise in the exit temperature of the exhaust gases and an increase in the dust loss from the kiln. The latter phenomenon is due to the chains whirling up dry raw material, thereby generating more dust, which, in turn, increases the load imposed on the dedusting equipment of the kiln.

The kiln reacts in the same way if forced beyond its rated production capacity: rising exhaust gas temperature and increased dust loss, resulting in increased fuel consumption per unit of burned lime produced. Hence, the chain system of the kiln imposes stringent limits for the possibilities of boosting kiln production, and another inherent disadvantage of the system is the need regularly to replace the chains due to wear, which, in addition to the capital outlay on new chains, necessitates shut down of kiln, and hence interruption of production, causing an undesirable increase in the total operating costs.

Another known method for lime sludge reburning consists in replacing the chain system of a rotary kiln with a drier crusher, e.g. of the hammer mill type, which, viewed in the flow direction of the supplied raw material, is mounted before the kiln, hence permitting a boost in the production capacity for a specific size of kiln. In such a plant the sticky, often lumpy, wet lime sludge is fed to the drier crusher together with hot exhaust gas from the kiln, being pulverized and dried in the drier crusher and carried by the drying gas, and suspended therein, as a powder to a separation cyclone, in which the powder is separated from the exhaust gas and fed to the rotary kiln as dry material. Such a drying plant, which is also known in other contexts, see e.g. EP 0 041 113, is, however, associated with other significant disadvantages. A new machine, the drier crusher, is incorporated, which must be designed for withstanding temperatures of up to 700° C., necessitating use of special steel, and the machine must be maintained. The dust loss is relatively high due to the inability of the separation cyclone to separate off the relatively large fine fraction formed when the lime sludge is crushed in the drier crusher, and the ducts between rotary kiln and drier crusher are exposed to cakings due to the dust from the rotary kiln being sticky within the 600°–700° C. temperature range which is a normally occurring temperature in the exhaust gas outlet of the kiln. Finally, utilization of a drier crusher entails infiltration of a certain amount of false air into the system and a relatively large pressure loss across the drier crusher per se, thus increasing the power consumption of the plant.

From U.S. Pat. No. 5,110,567 is known a third method for lime sludge reburning, which consists in replacing the drier crusher with a pneumatic drying device, wherein lime sludge subjected to prior filtration is introduced and dried by use of exhaust gas from a rotary kiln. The dried lime sludge is separated from the exhaust gas in a cyclone and directed to the material inlet of the rotary kiln. One of the advantages of this method is that, as disclosed in the patent specification, the final temperature of the exhaust gas is reduced as compared with the other known methods, and, consequently, a reduction in fuel consumption is claimed. In practice, the advantage offered by the lower final temperature of the exhaust gas will presumably, at least partially, be offset by the fact that the temperature of the dried lime sludge being fed to the rotary kiln is also lower, so that the first section of the rotary kiln must be used for preheating the lime sludge. Another disadvantage associated with the use of the first section of the rotary kiln for the preheating of the material is that the material, because of its dry sticking tendency, will often cause ring formations in the preheating zone of the rotary kiln.

It is, however, proposed that this problem be solved by incorporating an additional process stage between the pneumatic drying device and the kiln consisting of a riser duct for preheating by means of hot exhaust gas the dried lime sludge as well as a separating device for separating the thus preheated lime sludge from the exhaust gas prior to its introduction into the kiln. Hence it will be possible to attain a given production by using a smaller kiln, thereby reducing also the capital costs. However, the disadvantage of this plant is that the temperature in this additional process stage may become so high that dry sticking problems will occur. Trials have indicated that dry sticking problems occur typically at temperatures in the range 400°–600° C., dependent on the composition of the treated material.

SUMMARY OF THE INVENTION

It is the object of the present invention to provide a method and a plant by means of which the aforementioned disadvantages associated with the prior art are remedied.

GB-A-663371 discloses a method, in which a stream of moist lime sludge in a first process stage is transformed into dry, pulverulent product ($CaCO_3$) by means of hot kiln-generated exhaust gas from which it is subsequently separated, and thereafter is preheated in a second process stage also by means of hot kiln-generated exhaust gas from which it is subsequently separated and directed to the kiln for formation of burned lime (CaO), the relationship between the amount of energy available in the exhaust gas for preheating in the second process stage and the amount of energy accumulated in the material which is to be preheated being so regulated that the temperature in the second process stage does not exceed a predetermined temperature lying within the range from 400°–600° C.

In a first way of carrying out such a method, according to a first aspect of the invention, the relationship between the amount of energy in the exhaust gas and the amount of energy in the material is regulated by dividing the stream of moist lime sludge which is to be treated into two substreams, of which one substream is introduced into the first process stage for drying and pulverizing and the second substream is introduced into the second process stage for preheating. It is preferred that the substream which is introduced into the second process stage constitutes up to 35% of the supplied stream of moist lime sludge which is to be treated.

In a second way of carrying out such a method, according to a second aspect of the invention, the relationship between the amount of energy in the exhaust gas and the amount of energy in the material is regulated by regulating the amount of exhaust gas which is diverted past the second process stage.

A plant for carrying out the method may comprise a first process stage consisting of a first riser duct connected to a kiln and configured for flash drying, and a first feed duct and a first material inlet for supplying moist raw material to the first riser duct in which the material is, in use, suspended in hot kiln exhaust gas and which leads to a first separating device for separating a dry, pulverulent product from the exhaust gas; a second process stage consisting of a second riser duct connected to the kiln and configured for preheating of dry, pulverulent product, and a second feed duct and a second material inlet for supplying material from the first separating device to the second riser duct in which, in use, the material is suspended in hot kiln exhaust gas and which leads to a second separating device for separating preheated product from the exhaust gas; a duct for conveying the preheated product separated from the second separating device to a material inlet of the kiln; and means for regulating the relationship between the amount of energy available in the exhaust gas for preheating in the second stage and the amount of accumulated energy in the material which is to be preheated.

The plant may comprise a device, such as a splitter gate, for dividing the stream of moist lime sludge in the feed duct into two substreams and a duct for conveying moist lime sludge from the dividing device to the second riser duct.

If the first process stage is connected in series to the second process stage, which in turn is directly coupled to the smoke chamber of the kiln so that initially the exhaust gas from the kiln is used for preheating dry, pulverulent product in the second process stage, and subsequently, after said product is separated, is used for drying and pulverizing of lime sludge in the first process stage, the plant may comprise a bypass duct for diverting the exhaust gas from the smoke chamber past the second process stage directly to the lower part of the riser duct of the first process stage at a location which is in a lower position than the material inlet.

The plant may further comprise dampers for regulation of the exhaust gas streams in the riser ducts and possibly the exhaust gas stream in the bypass duct in case of a plant where the two process stages are connected in series.

The kiln may be a rotary kiln, a fluid bed, a gas suspension calciner, or any type of kiln which is suitable for calcination/burning of lime.

As compared to the prior art, the present invention is distinguished in that the movable mechanical parts or units such as chain system or drier crusher, both of which are exposed to hard wear and tear and necessitating regular maintenance, are replaced by much simpler stationary design which comprises two serial or parallel riser ducts respectively configured for drying and pulverizing, of moist lime sludge and for preheating of dried lime sludge. In similarity with the method known from U.S. Pat. No. 5,110,567, the present invention is distinguished in that the final temperature of the exhaust gas is low in relation to the other known methods. As compared to U.S. Pat. No. 5,110,567, it is possible by means of the present invention to preheat the dried lime sludge in a stationary preheating stage to a temperature between 400° and 600° C. before it is fed to the kiln. It is therefore possible, without any attendant dry sticking problems, to achieve a greater production in a kiln of a specific size, or, as a matter of course, to attain also a given production by using a smaller kiln. A further benefit obtained in addition to the lower capital cost of the smaller kiln relates to a reduction of the specific fuel consumption of the kiln.

BRIEF DESCRIPTION OF THE DRAWINGS

The invention will now be described, by way of example with reference to the accompanying diagrammatical drawings, in which.

In the figures the same reference numerals are applied to the same components.

DESCRIPTION OF THE PREFERRED EMBODIMENT

Figure 1:
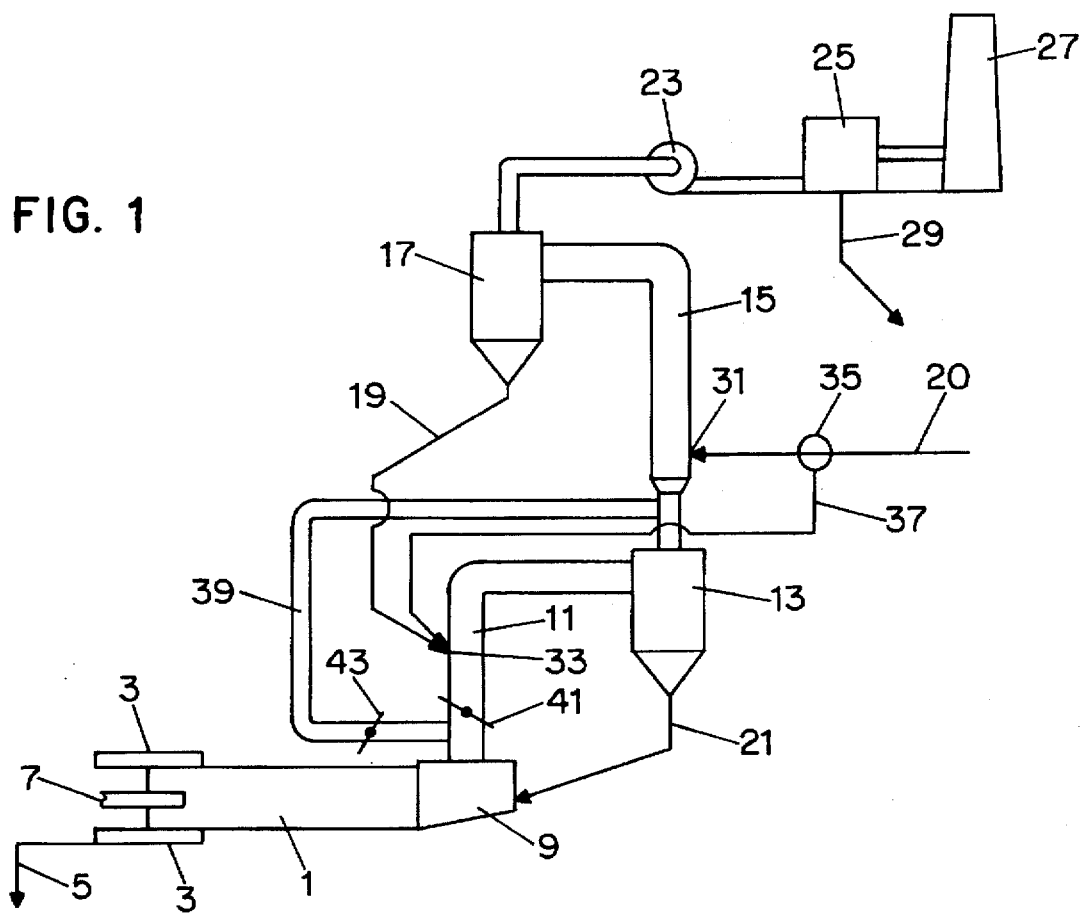
FIG. 1 shows a first embodiment of the invention.
Figure 2:
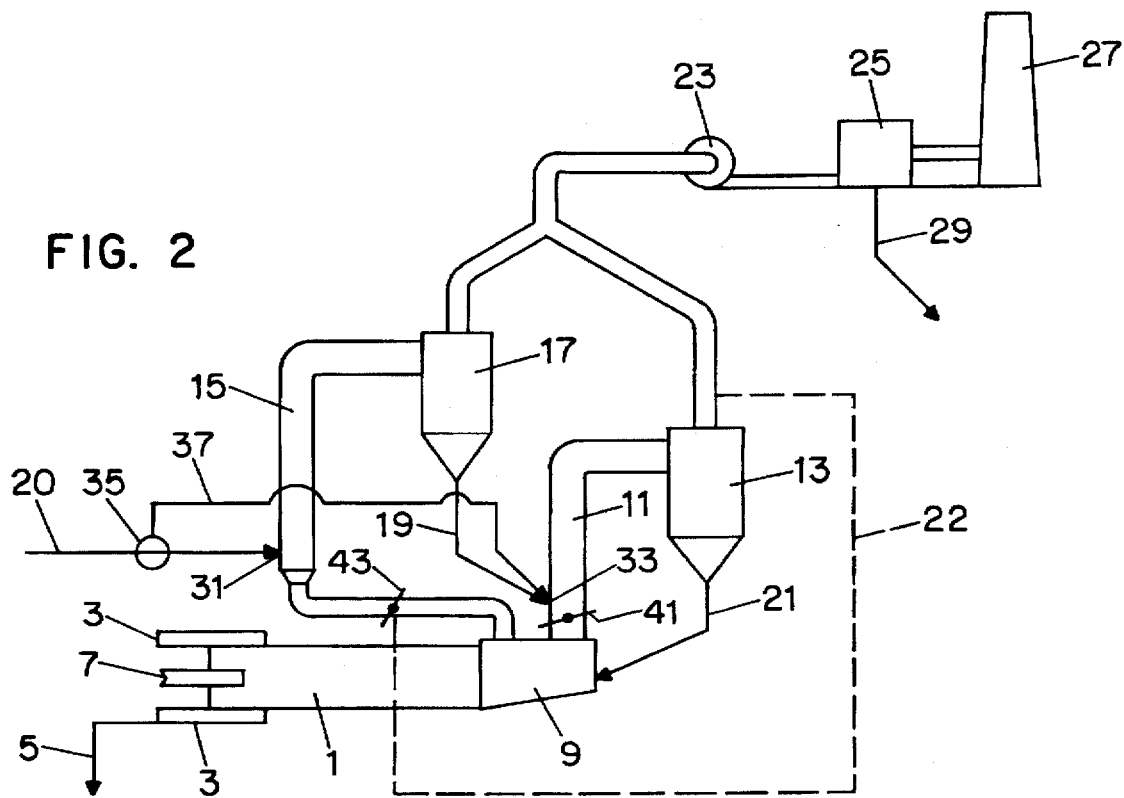
FIG. 2 shows a second embodiment of the invention.

Both plants depicted in FIGS. 1 and 2 of the drawing incorporate a rotary kiln 1 with a cooler 3, in the present case a planetary cooler, for the product treated in the kiln, a material outlet 5, a burner 7 which is fired by oil, gas and/or bark powder, and a smoke chamber 9. Further, the plants incorporate a preheating stage consisting of a riser duct 11 and a separation cyclone 13, a drying and pulverizing stage also consisting of a riser duct 15, in the present case configured as a so-called flash pipe, and a separation cyclone 17, a duct 19 for directing dried product from the separation cyclone 17 to the riser duct 11, and a duct 21 for conveying preheated product from the separation cyclone 13 to the material inlet of the rotary kiln 1. The plants also incorporate a fan 23, by means of which the exhaust gas is drawn through the kiln system to an exhaust gas filter 25, from which the cleaned exhaust gas is vented to a stack 27.

In both plants the moist lime sludge which is to be treated is introduced via a duct 20 and a material inlet 31 in the lower end of the as a flash pipe configured riser duct 15, in which it is suspended, dried and pulverized in hot exhaust gas from kiln. In the separation cyclone 17 the dried, pulverulent material is separated from the exhaust gas and conveyed through duct 19 to the riser duct 11 in which it undergoes preheating to a temperature between 400° and 600° C. before being separated in the separation cyclone 13 from the exhaust gas used for preheating and conveyed via the duct 21 to the rotary kiln. The exhaust gas which is used for drying and/or preheating is subsequently vented to filter 25 and the stack 27. Collected dust from the exhaust gas may be discharged through an outlet 29. However, it is general practice to return the dust or a part hereof to the kiln system for additional treatment, which may advantageously be done by feeding and mixing the dust with the pulverulent material in the duct 19 or in the duct 21.

In FIG. 1 the preheating stage 11, 13 and the drying and pulverizing stage 15, 17 of the plant are mounted in series with the preheating stage coupled directly to the smoke chamber 9 of the rotary kiln 1 so that initially the exhaust gas from the rotary kiln 1 is used for preheating dry, pulverulent product in the preheating stage and subsequently used for drying and pulverizing of lime sludge in the drying and pulverizing stage.

In FIG. 2 the preheating stage 11, 13 and the drying and pulverizing stage 15, 17 of the plant are both directly coupled to the smoke chamber of the rotary kiln 1 and constitute thereby two, for the exhaust gas, separate, parallel process stages, while in terms of the lime sludge to be treated, they constitute two series-connected process stages, of which the first one is used for drying and pulverizing lime sludge whereas the second stage is used for preheating dry, pulverulent product separated from the exhaust gas stream in the first process stage. In the figure the exhaust gas ducts from the separation cyclones 13, 17 of the two process stages are consolidated into one single exhaust gas duct which vents the exhaust gas to the filter 25 and the stack 27. The exhaust gas ducts may, however, also be individually connected to a separate filter and a separate stack.

For regulation of the temperature in the riser duct 11, both plants may comprise a dividing device 35 for extracting a substream of the moist lime sludge stream supplied in duct 20. This substream, which will typically constitute between 0 and 35% of the total material stream, is fed via a duct 37 and a material inlet, possibly the material inlet 33, in the riser duct 11. As a result, the temperature in the riser duct 11 can be lowered to an appropriate level where dry sticking is avoided.

The plant depicted in FIG. 1 may further or alternatively comprise a bypass duct 39 so that a portion of the hot exhaust gas from the smoke chamber 9 can be diverted past the second process stage 11, 13 directly to the lower part of the riser duct 15 of the first process stage at a location which is placed in a lower position than the material inlet 31. Hence the amount of energy available for preheating can be reduced so that the temperature in the riser duct 11 can be maintained at an appropriate level.

Both plants may further comprise dampers 41, 43 for regulation of the exhaust gas streams through the plant. In the plant depicted in FIG. 1, such dampers 41, 43 may advantageously be located at the lower end of the riser duct 11 and in the bypass duct 39, whereas, in the plant depicted in FIG. 2, they may be located at the lower end of the two riser ducts 11 and 15.

The plant in FIG. 2 may also comprise a duct 22 for directing at least a portion of the exhaust gas used for preheating the material from the exhaust gas outlet of the second separating device 13 to the lower part of the first riser duct 15.

The riser ducts 15 in both examples are described above as being configured as a so called flash pipe. For a riser duct to be suitable as a flash pipe, i.e. suitable for flash drying, its internal diameter must be such to ensure a sufficiently high gas velocity in the material inlet area in order that the moist material is entrained. Although the duct may have a substantially constant internal diameter over its entire length, in order to avoid the duct being too long and the pressure loss too great, it is preferred that the duct has a derestriction from a smaller diameter to a larger diameter adjacent to the material inlet. In FIGS. 1 and 2 the material inlet is at the lowest part of the larger diameter section of the duct but it would be equally possible for the inlet to be at the uppermost part of the smaller diameter section of the duct. Other configurations are possible, such as, for example, a restriction to a smaller diameter section immediately followed by derestriction to a larger diameter section, the material inlet being adjacent to the restricted section through which the velocity is greatest. Furthermore, the restriction could be variable, if provided, for example, by a pivotable flap which variably obstructs the passage through a constant diameter duct.

I claim:

1. A method for heat treatment of lime sludge ($CaCO_3$) material formed by causticizing process during manufacture of paper pulp, wherein a stream of moist lime sludge in a first process stage is transformed into a dry, pulverulent product ($CaCO_3$) by means of hot kiln-generated exhaust gas from which it is subsequently separated and thereafter preheated in a second process stage also by means of hot kiln-generated exhaust gas from which it is subsequently separated and thereafter directed to a kiln for formation of burned lime (CaO), the relationship between the amount of energy available in the exhaust gas for preheating in the second process stage and the amount of energy accumulated in the material which is to be preheated being so regulated that the temperature in the second process stage does not exceed a temperature lying within the range from 400°–600° C.; said method further comprising regulating the relationship between the amount of energy in the exhaust gas and the amount of energy in the material by dividing the stream of moist lime sludge which is to be treated into two substreams, of which one substream is introduced into the first process stage for drying and pulverizing and the second substream bypasses the first process stage and is introduced into the second process stage for preheating.

2. A method according to claim 1, wherein the substream which is introduced into the second process stage comprises up to 35% of the supplied stream of moist lime sludge which is to be treated.

3. A method for heat treatment of lime sludge ($CaCO_3$). Material formed by causticizing process during manufacture of paper pulp, wherein a stream of moist lime sludge in a first process stage is transformed into a dry, pulverulent product ($CaCO_3$) by means of hot kiln-generated exhaust gas from which it is subsequently separated and thereafter preheated in a second process stage also by means of hot kiln-generated exhaust gas from which it is subsequently separated and thereafter directed to a kiln for formation of burned time (CaO), the relationship between the amount of energy available in the exhaust gas for preheating in the second process stage and the amount of energy accumulated in the material which is to be preheated being so regulated that the temperature in the second process stage does not exceed a temperature lying within the range from 400°–600° C.; said method further comprising regulating the relationship between the amount of energy in the exhaust gas and the amount of energy in the material by diverting a portion of the exhaust gas past the second process stage and directly to the first process stage, and regulating the amount of exhaust gas so diverted so as to maintain the temperature in the second process stage within said range.

4. A plant for carrying out the method according to claim 1 or claim 3, the plant comprising a first process stage consisting of a first riser duct (15) connected to a kiln (1) and configured for flash drying, and a first feed duct (20) and a first material inlet (31) for supplying moist raw material to the first riser duct in which the material is suspended in hot kiln exhaust gas and which leads to a first separating device (17) for separating a dry, pulverulent product from the exhaust gas; a second process stage consisting of a second riser duct (11) connected to the kiln (1) and configured for preheating of dry, pulverulent product, and a second feed duct (19) and a second material inlet (33) for supplying material from the first separating device (17) to the second riser duct (11) in which the material is suspended in hot kiln exhaust gas and which leads to a second separating device (13) for separating preheated product from the exhaust gas; a duct (21) for conveying the preheated product separated from the second separating device (13) to a material inlet of the kiln (1); and means for regulating the relationship between the amount of energy available in the exhaust gas for preheating in the second stage and the amount of accumulated energy in the material which is to be preheated.

5. A plant according to claim 4, which further comprises a device (35) for dividing the stream of moist lime sludge in the first feed duct (20) into two substreams, and a duct (37) for conveying moist lime sludge from the dividing device (35) to the second riser duct (11).

6. A plant according to claim 4, where the first process stage is connected in series to the second process stage which is directly coupled to a smoke chamber (9) of the kiln (1) so that initially the exhaust gas from the kiln (1) is used for preheating dry, pulverulent product in the second process stage and subsequently, after the product has been separated, the gas is used for drying and pulverizing the lime sludge in the first process stage, the plant further comprising a bypass duct (39) for diverting exhaust gas from the smoke chamber (9) past the second process stage directly to the lower part of the first riser duct (15) of the first process stage at a location which is lower than the first material inlet (31).

7. A plant according to claim 4, further comprising dampers (41, 43) for regulation of the exhaust gas streams in the riser ducts (11, 15).

8. A plant according to claim 6, comprising dampers for regulation of the exhaust gas streams in the riser ducts or in the riser ducts and the bypass duct.

* * * * *